US007778908B1

(12) United States Patent (10) Patent No.: US 7,778,908 B1
Grumet (45) Date of Patent: Aug. 17, 2010

(54) CONVERTIBLE FINANCIAL INSTRUMENTS WITH CASH SETTLEMENT FEATURES

(75) Inventor: Alan M. Grumet, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 1282 days.

(21) Appl. No.: 10/249,542

(22) Filed: Apr. 17, 2003

(51) Int. Cl.
*G06Q 40/00* (2006.01)
(52) U.S. Cl. .......................... 705/36 R; 705/35; 705/37
(58) Field of Classification Search .................. 708/38, 708/36 R, 35, 37
See application file for complete search history.

(56) References Cited

U.S. PATENT DOCUMENTS

| | | | | |
|---|---|---|---|---|
| 2003/0135436 | A1* | 7/2003 | Birle et al. ..................... | 705/35 |
| 2004/0098327 | A1* | 5/2004 | Seaman ........................ | 705/36 |
| 2005/0004854 | A1* | 1/2005 | Jones et al. ................... | 705/35 |

FOREIGN PATENT DOCUMENTS

WO WO 03/014885 2/2003

OTHER PUBLICATIONS

Discussion of: Real Investment Implications of Employee Stock Option Exercises Wayne R Guay. SSRN Working Paper Series. Rochester: Feb. 2002.*
Rely on cash flows than earnings Businessline. Chennai: Jun. 30, 2002. p. 1.*
Ebitda loses out to EPS returns South China Morning Post. Hong Kong: Aug. 23, 2002. p. 12.*

* cited by examiner

*Primary Examiner*—Lalita M Hamilton
(74) *Attorney, Agent, or Firm*—Michael A. Springs; Moore & Van Allen PLLC

(57) ABSTRACT

Convertible financial instruments with cash settlement features. The present invention provides a way for an issuer to conduct a convertible instrument offering with a feature that allows the issuer to account for bonds using the "treasury stock method" of accounting. This bond offering feature is referred to herein as the "net share settlement feature" and includes both specific terms incorporated into the debt instruments, and a documented intention on the part of the issuer to settle the par, or the accreted face amount, of convertible bonds in cash. With the net share settlement feature in place, an issuer takes the convertible instruments into account using the treasury stock accounting formula to calculate its diluted earnings per share (EPS).

13 Claims, 1 Drawing Sheet

CONVERTIBLE FINANCIAL INSTRUMENTS WITH CASH SETTLEMENT FEATURES

BACKGROUND OF INVENTION

Many business entities raise money by means of a mix of debt instruments, such as bonds, and equity instruments, such as stock. The mix selected by a particular entity is influenced by prevailing interest rates, as well as other factors such as the extent to which the market is willing to purchase newly issued instruments of one type or the other at any particular time. Convertible instruments have some of the qualities of bonds as well as some of the qualities of stock. A convertible instrument, such as a convertible bond, is a debt instrument which can be converted by its holder into a number of shares of stock, the number typically being fixed or being determined by a formula. Often, such an instrument states a conversion price per share. With such an instrument, the conversion price is divided into the par value of the bond to determine the number of shares available in the conversion. Thus, a holder has the option of converting the bond into shares of stock, as opposed to simply cashing in the bond in order to retire the debt obligation of the issuer.

One disadvantage of issuing convertible bonds is that such instruments may have an adverse affect on a company's apparent diluted earnings per share (EPS) figure. Under generally accepted accounting principles, it is typically assumed that convertible bonds must be accounted for using the "if converted" method of accounting in determining a company's EPS. Thus, all shares into which outstanding bonds could potentially be converted must be considered outstanding shares for purposes of calculating the EPS.

As an example, consider a two hundred million dollar convertible bond offering which in the aggregate, is convertible into four million shares and pays interest at a rate of four percent annually. Assume the conversion price of the bonds is fifty dollars per share. Further, assume that the issuer has one hundred million actual diluted shares outstanding, and a net income of three hundred million dollars not considering the bond offering. Using the "if converted" method to calculate the diluted EPS for the issuer, the full conversion of all the bonds without regard to share price would be assumed. Under this method, the shares underlying the convertible would be added to shares outstanding (the diluted EPS denominator). In addition, net income would be reported without reduction by the interest expense associated with the convertible bonds (the diluted EPS numerator). The resulting EPS computation would be compared to basic EPS, which is computed using net income reduced by the bond interest expense (the basic EPS numerator) and the shares outstanding excluding the shares underlying the convertible (the basic EPS denominator). The more dilutive of these computations would be utilized for diluted EPS reporting purposes. For most issuers, the inclusion of the shares in the EPS denominator produces a more dilutive result than basic EPS. For those issuers, the diluted EPS would be calculated as follows:

$$\frac{\text{net income (without reduction by bond interest expense)}}{\text{diluted shares outstanding} + \text{shares underlying bonds}} = \text{diluted } EPS$$

or, in this example:

$300/(100+4)=\$2.88$ diluted EPS

Note that without including the shares underlying the convertible bonds, the diluted EPS number typically would be higher since the denominator of the above equation would be smaller. Although the numerator would be smaller as well, the denominator effect dominates the calculation for most issuers. Consequently, the adverse effect of the if converted method of accounting on diluted EPS can serve as a deterrent to issuing convertible instruments.

SUMMARY OF INVENTION

The present invention provides a way for an issuer to conduct a convertible instrument offering with a feature that allows the issuer to account for bonds using the "treasury stock method" of accounting to produce a more favorable EPS figure. This bond offering feature is referred to herein as the "net share settlement feature" and includes both specific terms incorporated into the debt instruments, and a documented intention on the part of the issuer to settle the par, or the accreted face amount, of convertible bonds in cash.

The present invention relates to a convertible or exchangeable financial instrument (including, for example, short or long-term zero coupon notes, cash-pay or partial-cash-pay convertible bonds, contingent or non-contingent payment convertible bonds, debt instruments, preferred instruments, trust preferred instruments, warrants, certain insurance contracts, and suitable derivatives thereof, or any securities backed by any of the above), and systems and methods for offering or servicing the same.

According to example embodiments of the invention, convertible instruments, each having a par value, are issued to a holder by an issuer under specified terms, wherein the specified terms include a cash settlement feature which enables the issuer to settle at least a portion of the conversion obligation in cash as opposed to shares. The cash settlement feature is spelled out in the convertible instrument or the debenture document, which specifies the legal terms of the debt obligation. Additionally, the cash settlement feature is typically described in any relevant offering document, such as an offering memorandum, circular, or a prospectus. The issuer then documents (or otherwise manifests) its intention to settle the par value of convertible instruments in cash, and the remainder in shares of the issuer's stock. This documentation in some embodiments takes the form of a letter or letters to the issuer's auditor or auditors. Convertible instruments according to embodiments of the invention spell out a debt obligation that is to be repaid, at least in part with shares of the issuer's stock, but also include the cash settlement feature which enables the issuer to settle at least a portion of the debt obligation in cash. The convertible instruments may also include an averaging formula to be used in the event of a cash settlement. With the net share settlement feature in place, an issuer takes the convertible instruments into account using the treasury stock accounting formula to calculate its diluted earnings per share (EPS).

It should be noted that convertible instruments and their marketing and issuance are typically accomplished through the use of data processing resources. Among other uses, the data processing resources are used to record transaction information in connection with bond sales. In many cases, instruments are actually held in "book entry form" wherein a record of the instrument is maintained primarily in the data processing system of a transfer agent such as a broker or bank. Offering documents may also be supplied in electronic form, for example, via the Internet. In any case, in many embodiments, data processing systems will form at least a portion of the means to carry out the invention.

DETAILED DESCRIPTION

Figure 1:
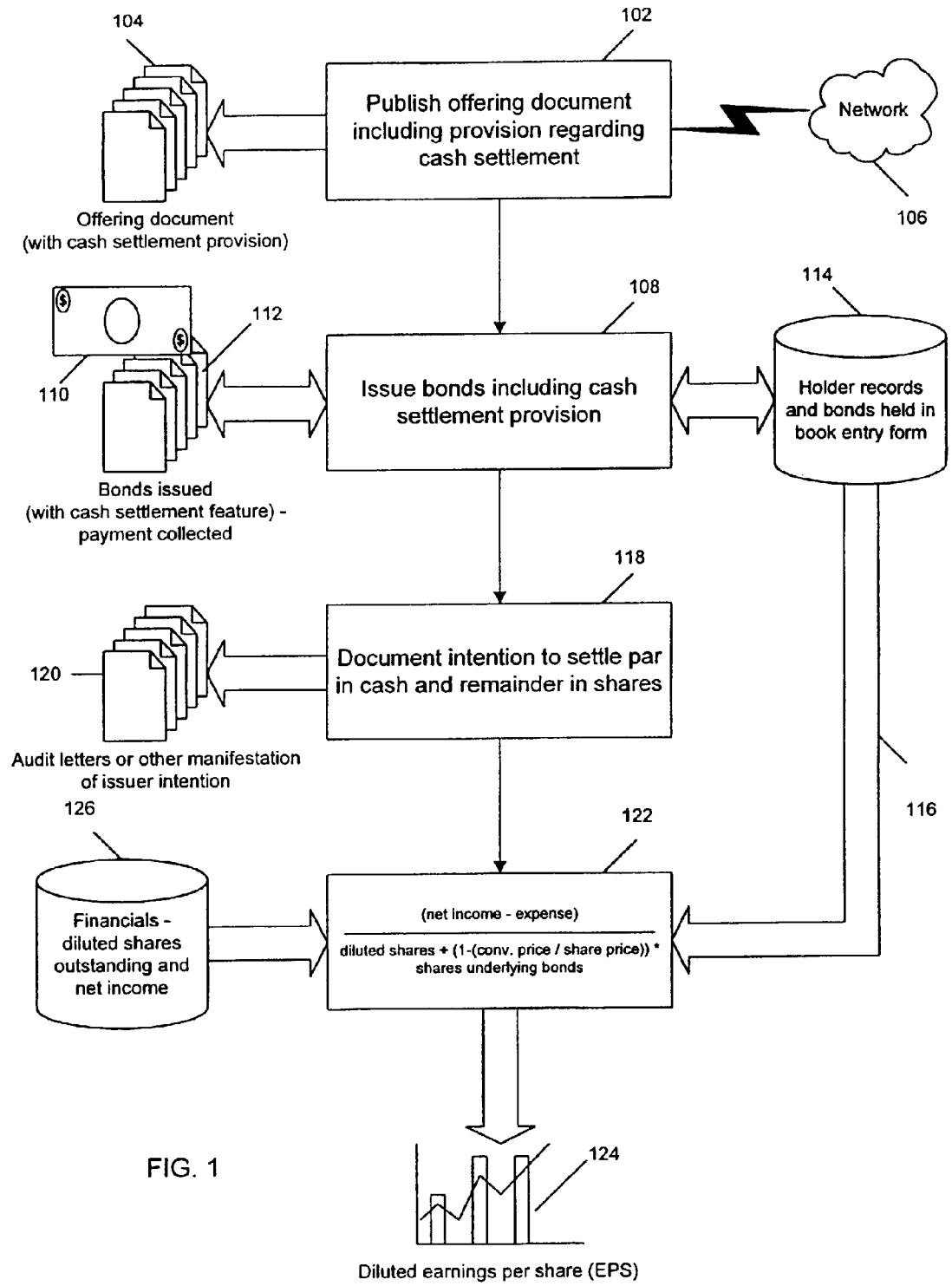
FIG. 1 is a combination flow chart and block diagram which illustrates the processes and the various structures and objects which are involved in carrying out a specific embodiment of the present invention.

The "if converted" method of reflecting the EPS impact of shares underlying a convertible instrument has been previously discussed. This method requires the inclusion of all of the potential shares in the denominator of the diluted earnings per share calculation. General accounting principles require this method to be used if there is no option to settle convertible instruments, such as bonds, with cash, or if it is unknown how the debt obligation of the instruments will likely be settled.

The "treasury stock" method of accounting produces more favorable EPS results for an issuer. Under the treasury stock method, shares are only included to the extent they have a dollar value equal to the excess of the conversion value over the accreted face amount of the instrument. The following example is illustrative. Again, assume a two hundred million dollar convertible bond offering is convertible into four million shares and pays interest at a rate of four percent annually. Again, assume that the conversion price of the bonds is fifty dollars per share. Also, as before, assume that the issuer has one hundred million diluted shares outstanding and a net income of three hundred million dollars before the bond offering. However, in this case, assume the stock has a current share price of sixty dollars. Under the treasury stock method, for purposes of calculating diluted EPS, only the "in the money" amount of shares is included in the diluted share account. The interest expense associated with the convertible instruments is also subtracted from net income, as conversion of the bonds is not assumed. Calculating EPS in the above example proceeds as follows:

$$\frac{net\ income - interest\ expense}{dil.\text{shares outstand.} + ((1 - (conv.\text{price}/current\ price)) * shares\ underlying\ bonds)} = dil.\ EPS$$

or, in this example:

($300−$4)/((100+(1−(50/60))*4)=$296/100.67=$2.94 diluted EPS.

It should be apparent from the examples above that the treasury stock method generally provides for more beneficial diluted earnings per share results than the use of the "if converted" method. Note that the base assumptions in terms of revenue and bond characteristics are the same in the above example as they were in the example of the "if converted" method shown in the background section of this disclosure.

Historically, issuers of convertible bonds and similar instruments have used the if converted method of accounting. It has heretofore been assumed in accounting for convertible instruments that there is no way to predict at the time of an offering how and when convertible instruments will be converted by their holders. Further, in order to maintain the instruments as truly "convertible," the instruments and any indentures or other documents which contain terms and conditions of the offering must at least in theory allow conversion into shares of the issuer's stock.

At this point it would be beneficial for the reader to have an understanding of current accounting standards. In the United States, accounting standards for the private sector are promulgated by the Financial Accounting Standards Board (FASB). The FASB has been officially recognized as authoritative by the Securities and Exchange Commission, an administrative agency of the United States government. The mission of the Financial Accounting Standards Board is to establish and improve standards of financial accounting and reporting for the guidance and education of the public, including issuers, auditors, and users of financial information. In 1984 the FASB established the Emerging Issues Task Force (EITF). The EITF provides timely financial reporting guidance to the FASB and also invites comments on its recommendations.

In January 2002, the EITF issued new guidance in a published document, EITF, Issue #90-19, which applies to convertible bonds in which the par amount is to be settled in cash and the conversion option can be settled in either shares or cash at the issuer's option. Under this new guidance, the issuer of such a convertible bond would use a treasury stock method of accounting to take the bonds into account in reporting its diluted EPS. Issue #90-19 does not specify how an issuer of a bond should account for the bond where the issuer merely has the option to settle all or any part of the conversion obligation in cash. However, another accounting document issued by the EITF, topic D-72, last updated Nov. 19, 1998, specifies that an issuer's auditors can conclude that the issuer of a convertible security can utilize a treasury stock method of accounting if the issuer demonstrates a current intention to settle par in cash and the conversion spread in net shares.

The present invention creates a convertible instrument offering which includes the net share settlement feature, and thus allows an issuer to use a treasury stock method of accounting and still comply with the above standards. In order to create such an offering according to embodiments of the invention, the issuer must include certain settlement options in the instruments themselves, and further, must document its intention to settle par (or the accredited face amount) in cash, and the conversion spread in shares. In order to meet the first requirement, in the case of a bond, the indenture contract provides the issuer with the option to settle all or a specified dollar portion of its conversion obligation in cash. Additionally, this cash settlement feature should be included in the description of the convertible debt instrument that is supplied in the offering document. An offering document is typically an offering memorandum, circular or prospectus that is supplied to potential holders for evaluation prior to purchase. The convertible instrument provisions must contain language sufficient to ensure that the conversion option constitutes an equity contract under the appropriate accounting guidelines, for example, EITF Issue #00-19, most recently updated Nov. 15, 2001. In some embodiments, the instrument provides for averaging in the event of a cash settlement. The averaging formula protects investors in the event of a cash settlement, which enables the issuer to preserve attractive pricing at the time of issuance.

In some embodiments, the instrument provides for a form of averaging over a period of days in the event of cash settlement. Using a form of averaging helps protect investors in the event of a cash settlement or partial cash settlement, which enables the issuer to preserve attractive pricing at the time of issuance. The precise form of averaging may vary. For instance, the amount of consideration delivered may be calculated based on an arithmetic average of the stock price over the specified period, or it may be calculated by creating separate tranches that effectively mature on each day of the specified period. In connection with cash settlement, some embodiments may contain mechanics to facilitate conversion prior to maturity, including notice provisions and an investor option to retract the conversion notice.

Upon issuance of the instruments, the issuer provides a letter to its auditors stating its intention to settle the par amount in cash and the remainder of the conversion obligation, if any, in common shares of stock upon conversion by investors. Although the issuer in this way demonstrates a current intention to settle par, as required by accounting standards, it is not legally required to do so; thus, flexibility is maintained. With this offering, under the applicable accounting rules, shares are added to the diluted EPS denominator using the treasury stock method, or its equivalent. Also, shares are not added to the diluted EPS denominator at all until the underlying share price exceeds the conversion price of the instrument, as the portion of the denominator attributable to the conversion is zero until that point. Thus, a more favorable EPS figure results from using the treasury stock method.

In order to fully enable the invention, an illustration of specific language to be included in the offering is provided below. Firstly, language from an offering circular for convertible bonds is shown. Note that such a circular would be relatively long and contain many terms and disclaimers. Only a portion of the circular which is relevant to the present invention is shown. The paragraphs below describe how the notes may be converted, including the option by the issuer to deliver a portion of the obligation in cash upon conversion.

"You may convert your note, in whole or in part, into shares of our common stock at any time prior to the close of business on the business day immediately preceding the maturity date, subject to our right to satisfy our obligations upon conversion in cash, in whole or in part, as described below. If you have submitted your notes to exercise your redemption right for repurchase upon a Fundamental Change, you may convert notes only if you withdraw your election. You may convert your notes in part so long as that part is $1,000 principal amount or an integral multiple of $1,000.

The initial conversion price for the notes is $_ per share of common stock, subject to adjustment as described below. We will not issue fractional shares of common stock upon conversion of notes. Instead, we will pay cash based on the average of the closing sales prices of our common stock for the five [NYSE/NASDAQ] trading days ending on the day prior to the conversion date for all fractional shares of common stock. Unless you convert your notes on an interest payment date and except as described below, you will not receive any accrued interest or dividends upon conversion.

Upon conversion, we may choose to deliver, in lieu of shares of our common stock, cash or a combination of cash and shares of our common stock, as described below."

The following paragraphs, from the same example circular, illustrate how settlement amounts are computed for the example bonds. Note that the averaging formula is shown in this passage.

"If we elect to satisfy the entire conversion obligation in cash, we will deliver to you cash in an amount equal to the product of:
a number equal to (i) the aggregate principal amount of notes to be converted divided by 1,000 multiplied by (ii) the conversion rate, and
the average closing price of our common stock during the cash settlement averaging period.
If we elect to satisfy a fixed portion (other than 100%) of the conversion obligation in cash, we will deliver to you such cash amount ("cash amount") and a number of shares equal to the greater of (I) zero and (ii) the excess, if any, of the number of shares calculated as set forth in the first bullet of this paragraph over the number of shares equal to the sum, for each day of the cash settlement averaging period, of (x) 10% of the cash amount, divided by (y) the closing price of our common stock. In addition, we will pay cash for all fractional shares of common stock . . . "

The following text is an example of the commensurate provisions of the convertible bonds themselves in the present example. In this case, the language is taken from the indenture. Note that in most cases, holders do not actually hold paper instruments, but rather the instruments are held in book entry form. This manner of holding convertible instruments will be discussed in further detail below with reference to FIG. 1.

"If a Holder elects to convert all or any portion of a Security into shares of Common Stock . . . and the Company receives such Holder's Conversion Notice on or prior to the day that is 20 days prior to Maturity (the "Final Notice Date"), the Company may choose to satisfy all or any portion of its conversion obligation (the "Conversion Obligation") in cash. Upon such election, the Company will notify such Holder through the Trustee of the dollar amount to be satisfied in cash (which must be expressed either as 100% of the Conversion Obligation or as a fixed dollar amount) at any time on or before the date that is two Business Days following receipt of written notice of conversion . . . (such period, the "Cash Settlement Notice Period"). If the Company elects to pay for any portion of the shares otherwise issuable to the Holder, the Holder may retract the conversion notice at any time during the two Business Day period beginning on the day after the final day of the Cash Settlement Notice Period (the "conversion Retraction Period"); no such retraction can be made (and a conversion notice shall be irrevocable) if the Company does not elect to deliver cash in lieu of shares (other than cash in lieu of fractional shares). If the conversion notice has not been retracted, then settlement (in cash and/or shares) will occur on the Business Day following the final day of the 10 Trading Day period beginning on the day after the final day of the Conversion Retraction Period (the "Cash Settlement Averaging Period"). Settlement amounts will be computed as follows:

(i) if the Company elects to satisfy the entire Conversion Obligation in shares of Common Stock, the Company will deliver to such Holder a number of shares equal to (1) the aggregate original principal amount at maturity of the Securities to be converted divided by 1,000 multiplied by (2) the Conversion Rate;

(ii) if the Company elects to satisfy the entire Conversion Obligation in cash, the Company will deliver to such Holder cash in an amount equal to the product of:

(1) a number equal to (x) the aggregate original principal amount at maturity of Securities to be converted divided by 1,000, multiplied by (y) the Conversion Rate, and (2) the average Closing Price of the Common Stock during the Cash Settlement Averaging Period; and (iii) if the Company elects to satisfy a fixed portion (other than 100%) of the Conversion Obligation in cash, the Company will deliver to such Holder such cash amount ("Cash Amount") and a number of shares equal to the greater of (1) zero and (2) the excess, if any, of the number of shares calculated as set forth in clause (I) above over the number of shares equal to the sum, for each day of the Cash Settlement Averaging Period, of (x) 10% of the Cash Amount, divided by (y) the closing price of the Common Stock on such day."

FIG. 1 illustrates the process and some of the elements involved in a convertible instrument offering according to embodiments of the invention. For example purposes, it is assumed that the instruments involved are convertible bonds. The process begins with the publishing of an offering document at step 102. The output of this step might be paper offering documents for potential holders, 104, or alternatively, offering documents delivered in electronic form over network 106. Network 106 may be the Internet, and the offering documents may be delivered in any of the formats commonly used in Internet communications, for example, hypertext mark up language (html) or portable document format (pdf). The offering document describes the cash settlement feature which implements certain features of embodiments of the invention. At step 108 the convertible bonds are issued to holders. Payment for the bonds is also collected as shown at 110. Each convertible bond instrument contains a debt obligation that is to be repaid, at least in part with shares of the issuer's stock, and a cash settlement feature which enables the issuer to settle at least a portion of its debt obligation in cash, as opposed to the shares. In some cases, paper bonds, 112 might be issued. In any case, data processing systems or a data processing system as indicated by the representation of a database at 114, will be used to record and manage transaction information connected with the bond sales. In many cases, the data processing system and database 114 will be managed by a transfer agent. Also, in many cases, paper bonds are not actually issued to a holder, but rather, a record of the holder's rights is simply recorded as a data structure containing a book entry in data processing system 114. Bonds issued in this fashion are referred to as being held in "book entry form."

A transfer agent, which services the offering, will typically track the underlying reference securities and service the security as well. The transfer agent will typically use a computerized accounting system capable of tracking the network. This system will also make calculations that are required when the debt obligation of an convertible instrument is settled. The system may also be used for data reporting services which are important for tax and financial calculations by the issuer. A connection between the data transfer agent's processing system and database is illustrated at 116, and will be further discussed below in reference to the EPS calculation.

As previously discussed, in order to fully implement the net share settlement feature of a bond offering according to the present invention, the issuer must document (or otherwise manifest) its intention to settle par in cash and the remainder in shares. The issuer documents its intentions at step 118. The output of this process is typically an audit letter, which states the intention as shown at 120. This audit letter will typically be supplied to the issuer's financial auditors. In some embodiments of the invention, the output of this process would be disclosure of the intention in the offering documents and/or in the issuer's public SEC filings.

At step 122, the issuer takes the outstanding bonds into account in its earnings per share calculations. The earnings per share number is reached with the formula that has been previously discussed. A first amount is calculated as equal to the net income of the issuer minus expenses associated with the convertible instruments. A second amount is calculated, and is equal to the number of diluted shares outstanding plus a quantity equal to the number of shares underlying the convertible instruments times a quantity equal to one minus the ratio of the conversion price to the share price. Finally, the EPS, indicated schematically at 124, is determined by dividing the second amount from the calculation into the first amount.

Financial information needed to perform these calculations is retained in a data processing system as shown at 126, and includes the number of diluted shares outstanding and the net income of the issuer. In most cases, these numbers are updated at regular intervals. Information about the bonds themselves is collected, usually from the transfer agent, sometimes by a network or data path connection as shown at 116, and as previously discussed.

It should be noted that many of the functions described herein can be carried out at least in part with the assistance of data processing resources, including computing platforms or instruction execution systems. Such systems include a central processing unit (CPU), random access memory (RAM), storage media, and computer program code in the form of computer software. Various functions can be performed either on stand-alone systems or on systems interconnected with the network, such as the network connections illustrated at 106 and 116 of FIG. 1.

Specific embodiments of an invention are described herein. The inventive concepts have other applications in other environments. The following claims are in no way intended to limit the scope of the invention to the specific embodiments described.

I claim:

1. A computerized method comprising:
    creating a book entry in a database, the book entry describing a convertible instrument purchased by a holder from an issuer under specified terms, wherein the specified terms comprise a cash settlement feature which enables the issuer to settle at least a portion of its conversion obligation in cash, as opposed to shares of the issuer's stock, anytime the convertible instrument is converted before maturity of the convertible instrument;
    recording, in the database, an intention by the issuer to settle a par value of the convertible instrument in cash and the remainder in shares of the issuer's stock anytime the convertible instrument is converted before maturity of the convertible instrument; and
    calculating, based at least partially on the intention and using a central processing unit (CPU) operatively connected to the database, a diluted earnings per share (EPS) value for the issuer using a treasury stock method of accounting that comprises subtracting interest expense associated with the convertible instrument from net income of the issuer.

2. The computerized method of claim 1 wherein calculating the diluted EPS value for the issuer further comprises:
    calculating, using the CPU, a first amount equal to the net income of the issuer minus the interest expense associated with the convertible instrument;
    calculating, using the CPU, a second amount equal to a number of diluted shares outstanding plus a first quantity equal to the number of shares underlying the convertible instrument times a second quantity equal to one minus a ratio of the conversion price on the convertible instrument to the current share price; and
    determining the diluted EPS value for the issuer by using the CPU to divide the second amount into the first amount.

3. The computerized method of claim 2 further comprising:
    publishing in electronic form over a network offering document describing the cash settlement feature.

4. The computerized method of claim 1 further comprises further comprising:
    publishing in electronic form over a network an offering document describing the cash settlement feature.

5. The computerized method of claim 1 further comprising averaging the stock price over a period of days in the event the cash settlement feature is used.

6. A data processing system comprising a representation of a document offering a convertible debt instrument to be issued by an issuer company and held by a holder, the data processing system comprising:

a database including a book entry comprising:

a debt obligation of the convertible debt instrument that can be repaid, at least in part, with shares of the issuer company's stock;

a cash settlement feature of the convertible debt instrument which enables the issuer company to settle at least a portion of its debt obligation in cash, as opposed to shares of the issuer company's stock, anytime the convertible debt instrument is converted before maturity of the convertible debt instrument; and an intention by the issuer company to settle the par value of the convertible debt instrument in cash and the remainder in shares of the issuer company's stock anytime the convertible debt instrument is converted before maturity of the convertible debt instrument; and a central processing unit (CPU) operatively connected to the database and computer program code that causes the CPU to calculate a diluted earnings per share (EPS) value for the issuer company using a treasury stock method of accounting that comprises subtracting interest expense associated with the convertible debt instrument from net income of the issuer company.

7. The data processing system of claim 6 wherein the convertible debt instrument is a bond.

8. The data processing system of claim 7 wherein the computer program code causes the CPU to calculate an averaging formula to average the stock price over a period of days in the event the cash settlement feature is used.

9. The data processing system of claim 8 wherein the computer program code causes the CPU to deliver the document over a computer network.

10. The data processing system of claim 8 wherein the computer program code further causes the CPU to:

calculate a first amount equal to the net income of the issuer minus the interest expense associated with the convertible instrument;

calculate a second amount equal to a number of diluted shares outstanding plus a first quantity equal to the number of shares underlying the convertible instrument times a second quantity equal to one minus a ratio of the conversion price on the convertible instrument to the current share price; and determine the diluted EPS value for the issuer by dividing the second amount into the first amount.

11. The data processing system of claim 7 wherein the computer program code causes the CPU to deliver the document over a computer network.

12. The data processing system of claim 6 wherein the computer program code causes the CPU to deliver the document over a computer network.

13. The data processing system of claim 6 wherein the computer program code further causes the CPU to:

calculate a first amount equal to the net income of the issuer minus the interest expense associated with the convertible instrument;

calculate a second amount equal to a number of diluted shares outstanding plus a first quantity equal to the number of shares underlying the convertible instrument times a second quantity equal to one minus a ratio of the conversion price on the convertible instrument to the current share price; and determine the diluted EPS value for the issuer by dividing the second amount into the first amount.

* * * * *